US008897995B2

(12) United States Patent
Kurtz

(10) Patent No.: US 8,897,995 B2
(45) Date of Patent: Nov. 25, 2014

(54) METHOD FOR CONTROLLING FUEL INJECTION FOR A DUAL FUEL ENGINE

(71) Applicant: Ford Global Technologies, LLC, Dearborn, MI (US)

(72) Inventor: Eric Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/191,336

(22) Filed: Feb. 26, 2014

(65) Prior Publication Data

US 2014/0180561 A1  Jun. 26, 2014

Related U.S. Application Data

(63) Continuation of application No. 13/174,419, filed on Jun. 30, 2011, now Pat. No. 8,706,386.

(51) Int. Cl.
*F02D 41/00* (2006.01)
*F02D 19/06* (2006.01)
*F02D 19/08* (2006.01)
*F02D 41/40* (2006.01)
*F02M 25/07* (2006.01)

(52) U.S. Cl.
CPC ............ *F02D 19/081* (2013.01); *F02D 19/061* (2013.01); *F02D 41/402* (2013.01); *F02D 19/0689* (2013.01); *F02D 19/0694* (2013.01); *F02M 25/0709* (2013.01); *F02D 19/0692* (2013.01); *F02D 19/0655* (2013.01); *F02D 19/0647* (2013.01); *F02D 41/0025* (2013.01); *F02D 41/401* (2013.01); *F02M 25/0728* (2013.01)

USPC ......................................................... 701/109

(58) Field of Classification Search
CPC ... F02D 19/081; F02D 19/0694; F02D 41/40; F02D 41/401; F02D 41/402; Y02T 10/36; Y02T 10/128
USPC ......................................... 701/102–104, 109
See application file for complete search history.

(56) References Cited

U.S. PATENT DOCUMENTS

| 6,055,963 | A | 5/2000 | Brown et al. |
|---|---|---|---|
| 6,668,789 | B1 | 12/2003 | Marriott et al. |
| 7,044,103 | B2 | 5/2006 | May |
| 7,270,089 | B2 | 9/2007 | Wong |
| 7,464,690 | B1 | 12/2008 | Reitz et al. |
| 7,668,640 | B2 | 2/2010 | Teraji et al. |
| 7,721,703 | B2 | 5/2010 | Kakuho et al. |
| 7,735,469 | B2 | 6/2010 | Miyata et al. |
| 7,757,659 | B2 | 7/2010 | Kurotani et al. |
| 7,913,673 | B2 | 3/2011 | Vanderslice et al. |
| 2007/0000456 | A1 | 1/2007 | Wong |
| 2007/0256648 | A1 | 11/2007 | Sun et al. |
| 2010/0017097 | A1* | 1/2010 | Bidner et al. ................. 701/103 |
| 2011/0192367 | A1 | 8/2011 | Reitz et al. |
| 2011/0289918 | A1* | 12/2011 | Wada .......................... 60/605.2 |
| 2012/0024269 | A1* | 2/2012 | Bidner et al. ............ 123/568.11 |
| 2012/0247421 | A1 | 10/2012 | Reitz et al. |

* cited by examiner

*Primary Examiner* — Hieu T Vo
*Assistant Examiner* — Arnold Castro
(74) *Attorney, Agent, or Firm* — Julia Voutyras; Alleman Hall McCoy Russell & Tuttle LLP

(57) ABSTRACT

A fuel injection system including injectors for two different fuels is disclosed. In one example, fuel injection is adjusted to compensate for changes in engine intake air amount. Combustion stability during transient conditions may be improved.

21 Claims, 11 Drawing Sheets

METHOD FOR CONTROLLING FUEL INJECTION FOR A DUAL FUEL ENGINE

CROSS REFERENCE TO RELATED APPLICATIONS

The present application is a continuation of U.S. patent application Ser. No. 13/174,419, "METHOD FOR CONTROLLING FUEL INJECTION FOR A DUAL FUEL ENGINE," filed on Jun. 30, 2011, the entire contents of which are hereby incorporated by reference for all purposes.

BACKGROUND/SUMMARY

Reactivity controlled compression ignition (RCCI) utilizes two fuels with different reactivities and multiple fuel injections to control air-fuel mixture reactivity in engine cylinders. Further, one of the fuels has a lower reactivity as compared to the other fuel. A homogenous charge comprising the low reactivity fuel, exhaust gas recirculation (EGR), and air is formed in an engine cylinder. As a piston in the cylinder compresses the homogenous mixture, the higher reactivity fuel may be injected at a time before ignition of the homogenous mixture is ignited. Combustion of the air-fuel mixture may be controlled in this way to reduce NOx and particulate matter while improving engine fuel economy. However, changes in the in cylinder oxygen concentration and/or boost related to transient engine operating conditions can affect the composition of cylinder charge mixture and degrade combustion.

The inventor herein has recognized the above-mentioned disadvantages and has developed an engine method, comprising: increasing an amount of a first fuel with a first reactivity injected to a cylinder during a transition greater than a threshold in response to an engine intake oxygen concentration error; decreasing an amount of a second fuel with a second reactivity injected to the cylinder during the transition in response to the engine intake oxygen concentration error; and compression igniting the first and second fuels in the cylinder.

By adjusting amounts of fuels having different reactivity rates injected to a cylinder during transient conditions in response to an engine air intake oxygen concentration error, it may be possible to improve transient engine emissions while at the same time providing a desired engine torque amount. For example, an engine air intake oxygen concentration can be controlled during steady state operating conditions so that NOx and particulate matter may be reduced. However, during transient conditions, the engine air intake oxygen concentration may be in error as compared to the desired engine air intake oxygen concentration. The engine air intake oxygen concentration error may be compensated via increasing an amount of a first fuel with a first reactivity injected into the cylinder during a cylinder cycle and decreasing an amount of a second fuel injected into the cylinder during the cylinder cycle. In this way, engine emissions during transient engine operating conditions may be controlled to approach steady state engine emissions during similar engine operating conditions The present description may provide several advantages. In particular, the approach may reduce engine emissions when fuels with different levels of reactivity are combusted in an engine. Further, the approach may allow for reduced sizing of exhaust after treatment devices since transient engine emissions may be improved. Further still, the approach may improve vehicle drivability during some conditions by providing a desired level of engine torque rather than misfiring or hesitating.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
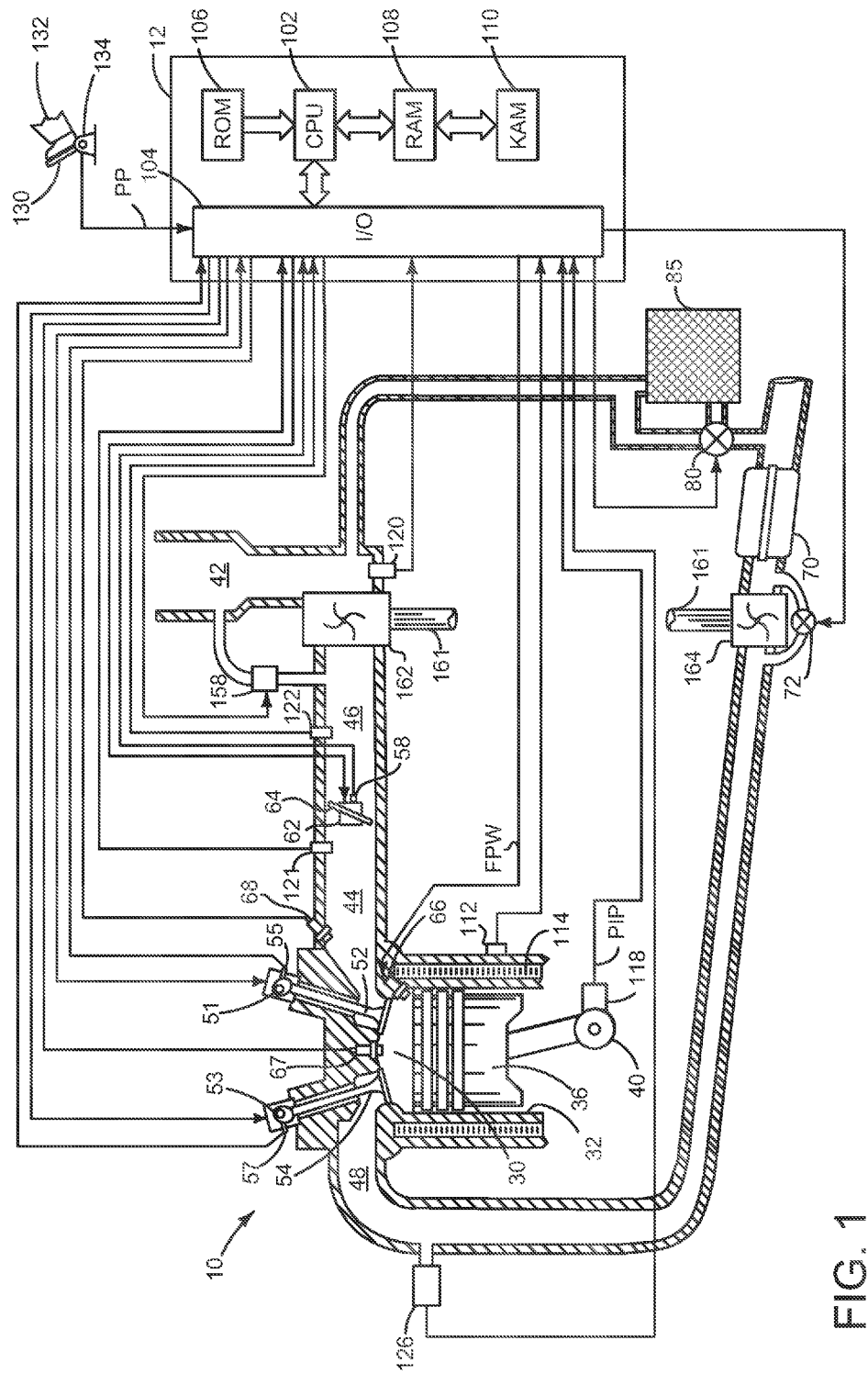
FIG. 1 shows a schematic depiction of an engine.

The present description is related to controlling fuel injection of an engine. FIG. 1 shows one example of a boosted direct injection engine where the method of FIGS. 10 and 11 may adjust fuel injection to compensate for transient engine operating conditions. FIGS. 2-9 show examples of engine operating sequences for comparing differences between compensated and uncompensated transient engine operating conditions.

For basic RCCI combustion, injection of two fuels is empirically determined and fuel injection timings and amounts are placed in a table that may be indexed via engine speed and load. The fuel injection timings and amounts are determined when the engine is operated at a constant speed and constant load. The fuel timings and amounts are adjusted to provide a desired combustion phasing that controls particulate matter production in the engine and NOx. However, if the fuel injection timings and fuel amounts determined for steady state engine operation (e.g., substantially constant engine speed and load) are applied when engine air charge, EGR, or boost change by more than a threshold amount, additional NOx and/or particulate matter may be formed due to changes in cylinder mixture. The method and system described herein adjusts fuel injection timing (e.g., start of injection timing) and fuel injection amounts so that the desired level of particulates and NOx may be achieved. In particular, the method described herein does not simply extract steady state fuel injection timings for two different fuels during transient conditions and output the revised fuel timings. Rather, the method and system described herein controls combustion phasing during transient conditions by increasing the amount of one fuel and decreasing the amount of the other fuel while providing the desired engine torque. In this way, combustion phasing can be controlled during transient engine operating conditions.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. In one example, fuel injector 66 supplies a first fuel with a higher level of reactivity to combustion chamber 30.

Fuel injector 68 is shown positioned to inject fuel into intake manifold 44 for ingestion into combustion chamber 30, which is known to those skilled in the art as port injection. Fuel injector 68 delivers fuel in proportion to a pulse width of a signal provided via controller 12. In one example, fuel injector 68 supplies a second fuel with a lower level of reactivity to combustion chamber 30. Alternatively, the lower reactivity fuel may be injected via optional direct injector 67. The lower reactivity fuel may be supplied from a second fuel tank that is isolated from the fuel tank containing the higher reactivity fuel. In one example, the higher reactivity fuel may be diesel fuel and the lower reactivity fuel may be gasoline. However, in other examples, other types of fuels may be substituted for diesel and gasoline. For example, diesel and alcohol may comprise higher and lower reactive fuels.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. Compressor speed may be adjusted via adjusting a position of wastegate 72 or compressor bypass valve 158. Wastegate 72 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162.

Combustion is initiated in combustion chamber 30 when fuel automatically ignites as piston approaches top-dead-center compression stroke. In some examples, a universal Exhaust Gas Oxygen (UEGO) sensor (not shown) may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a SCR.

EGR may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively EGR may be cooled via passing through EGR cooler 85.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine intake oxygen concentration from oxygen sensor 121 coupled to intake manifold 44; boost pressure from pressure sensor 122; exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: a diesel fuel injector directly injecting diesel fuel directly into an engine cylinder, the diesel fuel including a first reactivity rate; a second fuel injector injecting a second fuel to the engine cylinder, the second fuel including a second reactivity rate; and a controller, the controller including instructions for increasing a steady state amount of diesel fuel scheduled for injection based on an engine intake air amount error during a transition in engine operating state, the controller including further instruction for decreasing a steady state amount of the second fuel scheduled for injection based on the engine intake air amount error during the transition. The engine system further comprises additional controller instructions for increasing the steady state amount of diesel fuel scheduled for injection based on boost error during the transition in engine operating state. The engine system further comprises additional controller instructions for decreasing the steady state amount of the second fuel scheduled for injection based on boost error during the transition. In one example, the engine system includes where the second fuel injector is a port fuel injector. The engine system also includes where the second fuel injector is a direct fuel injector, where the second fuel is gasoline, compressed natural gas, liquid propane gas, or alcohol, and where a timing of a start of injection of the second fuel is adjusted in response to the transition. The engine system further comprises additional controller instructions for decreasing the steady state amount of diesel fuel scheduled for injection based on the engine intake air amount error, and further comprising additional instructions for adjusting the steady state amount of diesel fuel scheduled for injection based on the engine intake air temperature.

Referring now to FIGS. 2-9, seven engine control parameters are shown for different engine operating conditions. Each of FIGS. 2-9 show the same engine control parameters during different engine operating conditions. Each of FIGS. 2, 4, 6, and 8 show engine control parameters during conditions where engine operation is not compensated via adjusting fuel injection of two fuels with different reactivity rates. Each of FIGS. 3, 5, 7, and 9 show engine control parameters during conditions where engine operation is compensated via adjusting fuel injection of two fuels with different reactivity rates.

The first plot from the top of FIGS. 2-9 represents an engine torque request. The engine torque request may be made via an operator input (e.g., an accelerator pedal) or via an engine controller. The X axis represents time and time increases from right to left. The Y axis represents engine torque request amount and the amount increases in the direction of the Y-axis arrow.

The second plot from the top of FIGS. 2-9 represents engine combustion phase (e.g., location of peak cylinder pressure). The combustion phase may be varied by adjusting fuel injection timing, fractional amounts of the higher and lower reactive fuels, and air-fuel mixture temperature. The X axis represents time and time increases from right to left. The Y axis represents engine combustion phase and combustion phase advances in the direction of the Y-axis arrow.

The third plot from the top of FIGS. 2-5 represents desired and actual engine boost (e.g., level of pressurized air supplied to the engine via a compressor). Desired boost is indicated via a solid line while actual boost is indicated via a dash line. The amount of boost may be adjusted via varying a position of variable geometry turbocharger nozzle, a wastegate, or compressor bypass valve. The X axis represents time and time increases from right to left. The Y axis represents engine boost level and boost level increases in the direction of the Y-axis arrow.

The third plot from the top of FIGS. 6-9 represents desired and actual engine intake oxygen concentration. The amount of intake oxygen concentration may be adjusted via varying a position of an EGR valve a throttle or engine valve timing. Desired intake oxygen concentration is indicated via a solid line while actual intake oxygen concentration is indicated via a dash line. The X axis represents time and time increases from right to left. The Y axis represents engine EGR amount and EGR amount increases in the direction of the Y-axis arrow.

The fourth plot from the top of FIGS. 2-9 represents an amount of a fuel with a higher reactivity of two fuels injected to an engine. The amount of the fuel with a higher reactivity may be adjusted via increasing duration of a pulse width supplied to a fuel injector, by increasing fuel pressure, or by increasing fuel pressure and fuel pulse width. The X axis represents time and time increases from right to left. The Y axis represents amount of fuel with a higher reactivity, and the fuel amount increases in the direction of the Y-axis arrow.

The fifth plot from the top of FIGS. 2-9 represents injection timing of the fuel with a higher reactivity of the two fuels injected to an engine. The injection timing of the fuel with higher reactivity may be adjusted via adjusting a start of a fuel injection pulse relative to the engine crankshaft. The X axis represents time and time increases from right to left. The Y axis represents fuel timing phase relative to the engine crankshaft of the higher reactivity fuel, and the timing advances in the direction of the Y-axis arrow.

The sixth plot from the top of FIGS. 2-9 represents an amount of the lower reactivity fuel of two fuels injected to an engine. The amount of the lower reactivity fuel may be adjusted via increasing duration of a pulse width supplied to a fuel injector or by increasing fuel pressure. The X axis represents time and time increases from right to left. The Y axis represents amount of the lower reactivity fuel and the fuel amount increases in the direction of the Y-axis arrow.

The seventh plot from the top of FIGS. 2-9 represents injection timing of the fuel with lower reactivity of the two fuels injected to an engine. The injection timing of the lower reactivity fuel may be adjusted via adjusting a start of a fuel injection pulse relative to the engine crankshaft. The X axis represents time and time increases from right to left. The Y axis represents fuel timing phase relative to the engine crankshaft of the lower reactivity fuel and the timing advances in the direction of the Y-axis arrow.

Figure 2:
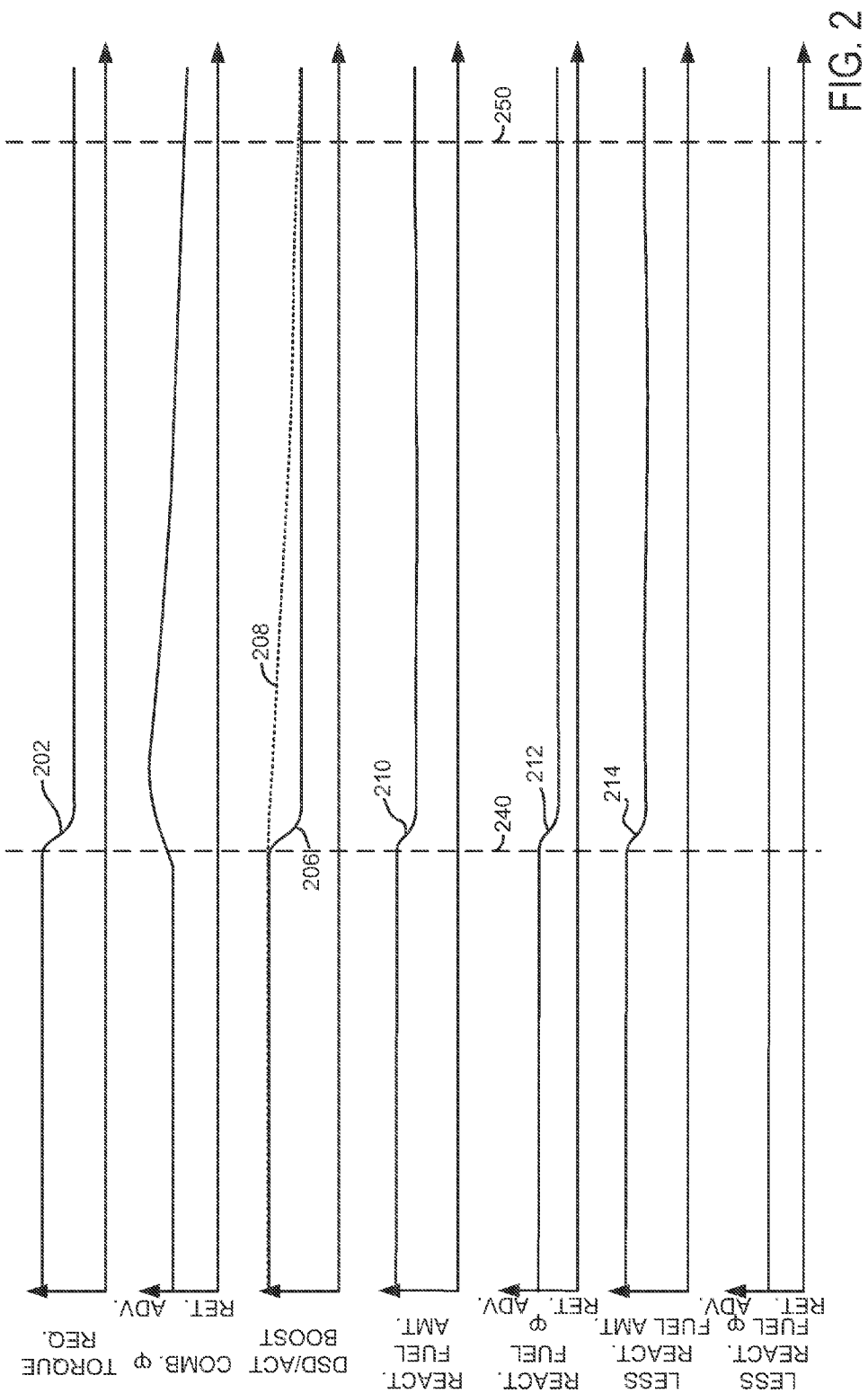
FIGS. 2-9 show example transient engine operating sequences.

Referring now to FIG. 2, signals of interest during an uncompensated change in torque and boost are shown. In the example of FIG. 2, there is a decrease in engine torque requested. Vertical marker 240 represents the onset of a change in engine operating conditions. Vertical marker 250 represents an end of the change in engine operating conditions. In the example of FIG. 2, the desired and actual boost are substantially equal before vertical marker 240 and after vertical marker 250.

At 202, the engine torque request is changed from a higher level to a lower level. The desired boost also decreases as shown at 206 because less boost is needed to match the desired torque. However, the actual boost 208 continues at a higher level until pressure is relieved via pumping cylinders at vertical marker 250. The boost error is represented by the area between curve 206 and curve 208. The excess boost causes the combustion phase to initially advance after the change in torque request. The combustion phase eventually stabilizes at a more retarded timing after vertical marker 250. Thus, before the torque request transition at 202, the combustion phasing is at a first timing, and combustion phasing settles to a second timing related to fuel injection amount, fuel timing, and fuel mixture properties (e.g., reactivity of the mixed fuel composition formed by injecting a fuel with a higher reactivity and a fuel with a lower reactivity) after vertical marker 250.

The amount of higher reactivity fuel injected to the engine 210 decreases in response to the decrease in engine torque at 202. Similarly, the amount of lower reactivity fuel injected to the engine 214 decreases in response to the decrease in engine torque 202. Further, the injection timing of the higher reactivity fuel 212 is retarded in response to the change in the engine torque at 202. The injection timing of the lower reactivity fuel remains constant because the fuel is injected via a port injector.

Thus, without compensating for a difference between the desired and actual boost, combustion phasing can shift so as to increase the possibility of degraded engine emissions. Further, engine torque can follow combustion phasing and may follow a less desirable trajectory so that the engine operator may be disturbed via misfire or an undesirable change in engine torque.

Figure 3:
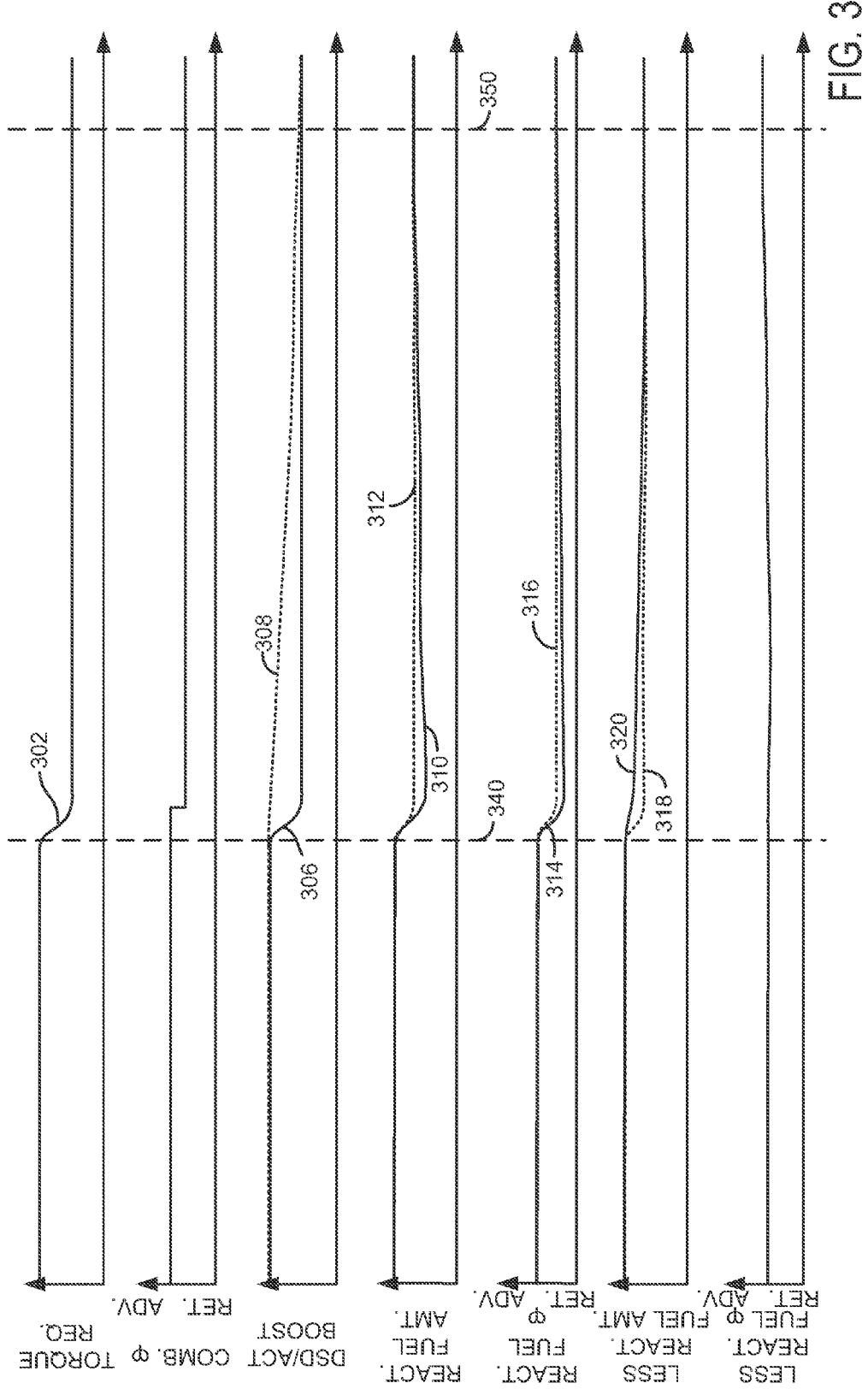

Referring now to FIG. 3, signals of interest during a compensated change in torque and boost are shown. In the example of FIG. 3, there is a decrease in engine torque requested. Vertical marker 340 represents the onset of a change in engine operating conditions. Vertical marker 350 represents an end of the change in engine operating conditions. In the example of FIG. 3, the desired and actual boost are substantially equal before vertical marker 340 and after vertical marker 350.

At 302, the engine torque request is changed from a higher level to a lower level. The desired boost also decreases as shown at 306 because less boost is needed to match the desired torque. However, the actual boost 308 continues at a higher level until pressure is relieved via pumping cylinders at vertical marker 350. The boost error is the indicated by the area between curve 306 and curve 308. In the example of FIG. 3, the excess boost does not cause wavering combustion phase as shown in FIG. 2 because injection of the higher and lower reactivity fuels is adjusted. The combustion phase stabilizes shortly after the torque request stabilizes at 302. Thus, before the torque request transition at 302, the combustion phasing is at a first timing, and combustion phasing transitions to a second timing related to fuel injection amount, fuel timing, and fuel mixture properties (e.g., reactivity of the mixed fuel composition formed by injecting a fuel with a higher reactivity and a fuel with a lower reactivity) after torque request 302 but well before vertical marker 350 where the desired and actual boost levels are substantially equal. Further, the combustion phasing may have fewer tendencies to waver before reaching a steady state combustion phasing at the steady state engine operating conditions after the engine torque transition.

The amount of the compensated higher reactivity fuel 310 injected to the engine decreases in response to the decrease in engine torque 302 and/or desired boost at 306. The amount of the higher reactivity compensated fuel 310 is decreased by more than the amount of the higher reactivity uncompensated fuel 312. The amount of the lower reactivity compensated fuel injected to the engine 320 decreases less as compared to the amount of the lower reactivity uncompensated fuel injected to the engine 318 in response to the decrease in engine torque 302 and/or desired boost. The injection timing of the higher reactivity compensated fuel 314 is more retarded than the timing of the higher reactivity uncompensated fuel 316 in response to the change in the engine torque at 302 and/or desired boost. The injection timing of the lower reactivity fuel remains constant because the fuel is injected via a port injector.

Thus, timing (e.g., start of fuel injection timing) and fuel amounts of two fuels with different reactivity rates can compensate for a difference between the desired and actual boost during a transient condition that is greater than a threshold level. In this way, combustion phasing and cylinder pressure may be controlled so as to reduce the possibility of degraded engine emissions. Further, engine torque may have less tendency to vary following a transition where engine boost lags desired engine boost. Consequently, for engine operating conditions that hasten combustion (e.g., higher boost, higher intake charge temperature, increased engine intake oxygen concentration) additional amounts of lower reactivity fuel can be injected to the engine while the reduced amounts of higher reactivity fuel are injected to the engine. In this way, combustion phasing can be adjusted to a desired combustion phasing and engine torque may follow a desired engine torque so as to improve engine torque response and emissions. Alternatively, for engine operating conditions that slow combustion (e.g., lower boost, lower intake charge temperature, lower air-fuel mixture oxygen concentrations) reduced amounts of lower reactivity fuel can be injected to the engine while the increased amounts of higher reactivity fuel are injected to the engine. Further, during conditions of excess boost or low burnt gas fraction, fuel injection timing of two fuels can be adjusted during a transient condition to reduce engine noise and NOx. On the other hand, during conditions of reduced boost or high burnt gas fraction, fuel injecting timing of two fuels can be adjusted during a transient to reduce misfire, torque disturbances, CO and HC emissions.

Figure 4:
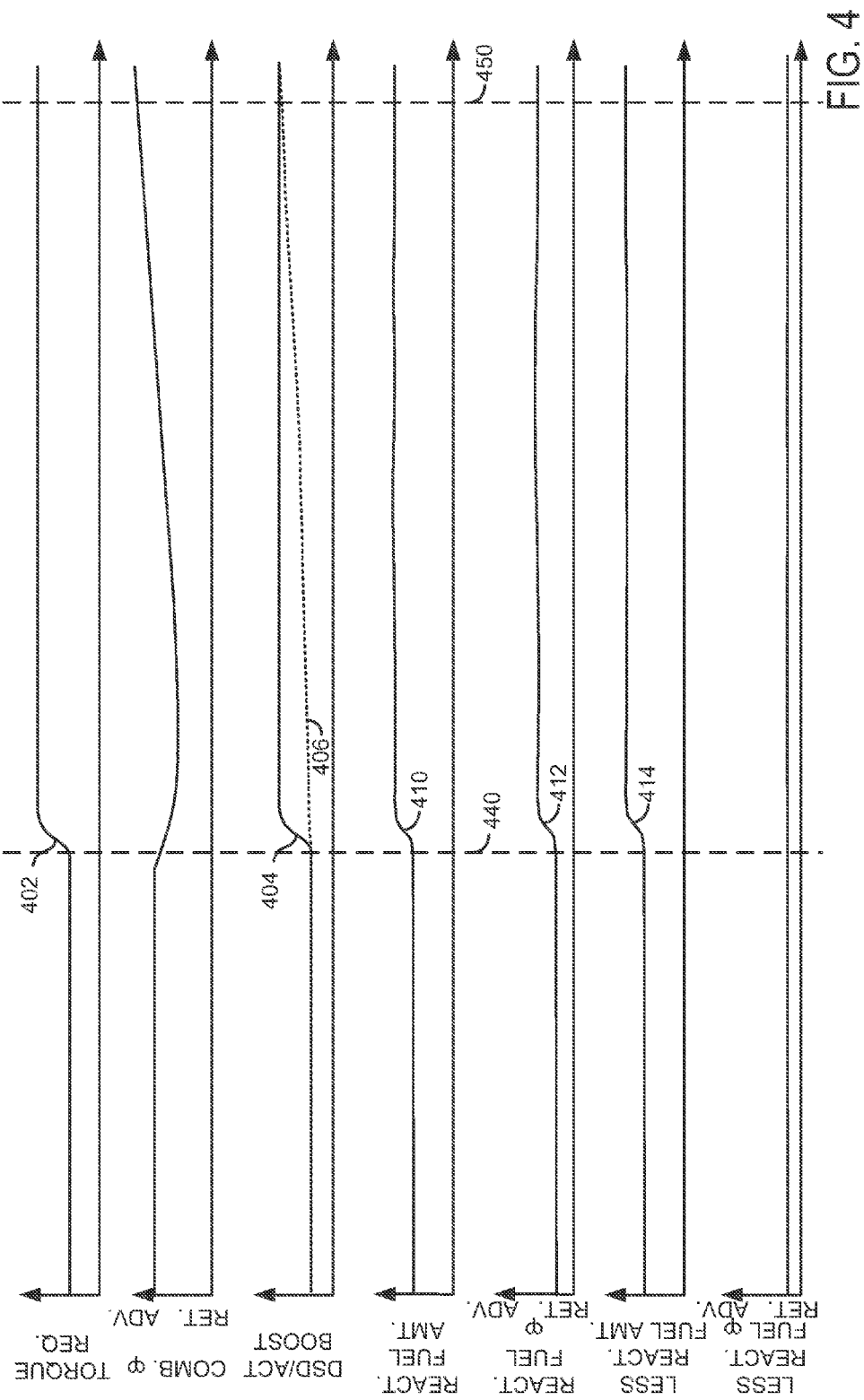

Referring now to FIG. 4, signals of interest during an uncompensated change in torque and boost are shown. In the example of FIG. 4, there is an increase in engine torque requested. Vertical marker 440 represents the onset of a change in engine operating conditions. Vertical marker 450 represents an end of the change in engine operating conditions. In the example of FIG. 4, the desired and actual boost are substantially equal before vertical marker 440 and after vertical marker 450.

At 402, the engine torque request is changed from a lower level to a higher level. The desired boost also increases as shown at 404 because additional boost is needed to match the desired torque. However, the actual boost 406 continues at a lower level until pressure is increased via a compressor at vertical marker 450. The boost error is represented by the area between curve 404 and curve 406. The reduced boost causes the combustion phase to initially retard after the change in torque request. The combustion phase eventually stabilizes at a more advanced timing after vertical marker 450. Thus, before the torque request transition at 402, the combustion phasing is at a first timing, and combustion phasing settles to a second timing related to fuel injection amount, fuel timing, and fuel mixture properties (e.g., reactivity of the mixed fuel composition formed by injecting a fuel with a higher reactivity and a fuel with a lower reactivity) after vertical marker 450.

The amount of the higher reactivity fuel injected to the engine 410 increases in response to the increase in engine torque at 402. Similarly, the amount of the lower reactivity fuel injected to the engine 414 increases in response to the increase in engine torque 402. Further, the injection timing of the higher reactivity fuel 412 is advanced in response to the change in the engine torque at 402. The injection timing of the lower reactivity fuel remains constant because the fuel is injected via a port injector.

Thus, without compensating for a difference between the desired and actual boost during increasing boost, combustion phasing can shift so as to increase the possibility of degraded engine emissions. Further, engine torque can follow combustion phasing and may follow a less desirable trajectory so that the engine operator may be disturbed.

Figure 5:
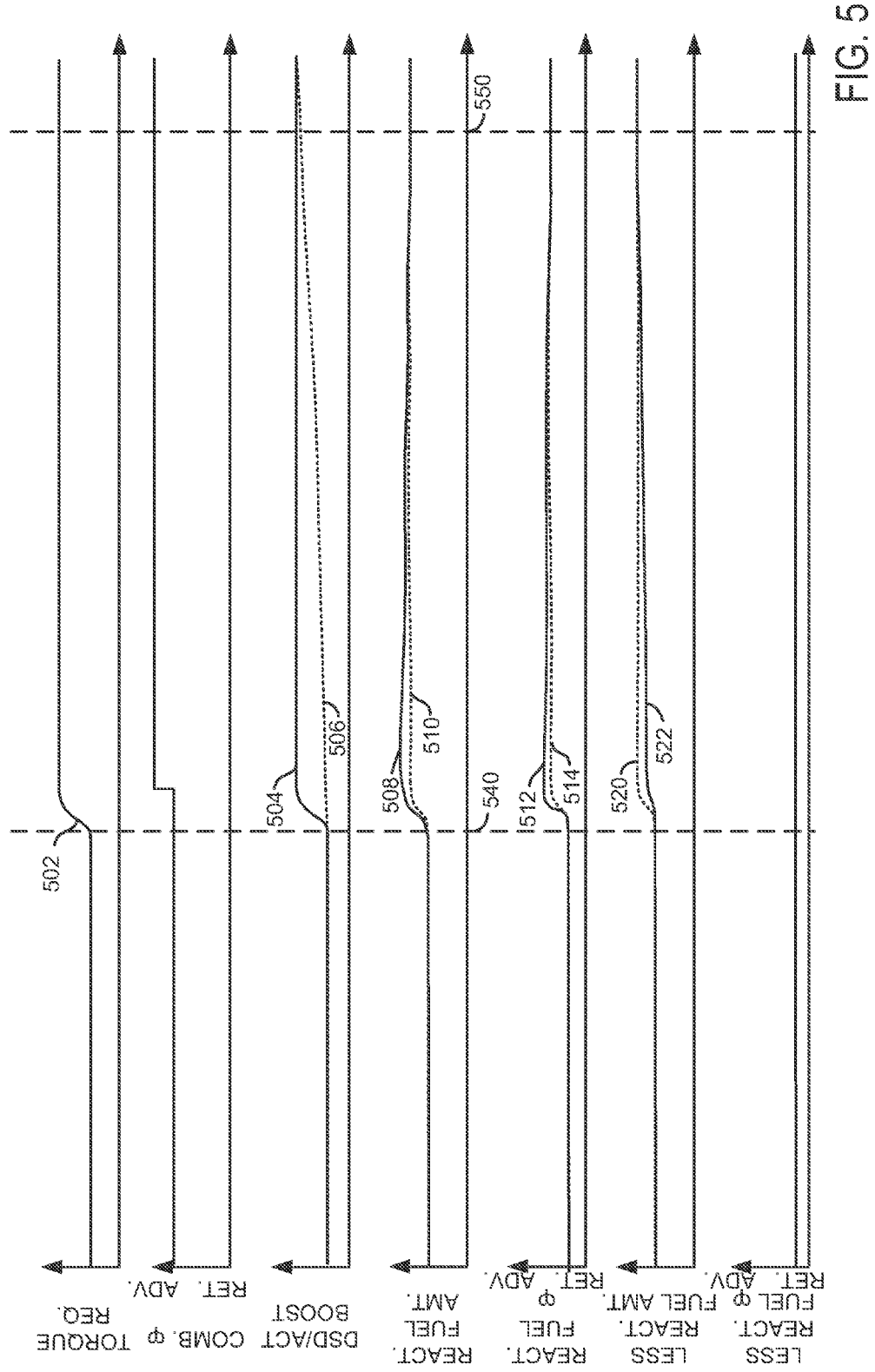

Referring now to FIG. 5, signals of interest during a compensated change in torque and boost are shown. In the example of FIG. 2, there is an increase in engine torque requested. Vertical marker 540 represents the onset of a change in engine operating conditions. Vertical marker 550 represents an end of the change in engine operating conditions. In the example of FIG. 5, the desired and actual boost are substantially equal before vertical marker 540 and after vertical marker 550.

At 502, the engine torque request is changed from a lower level to a higher level. The desired boost also increases as shown at 504 because lower boost is needed to match the desired torque. However, the actual boost 506 continues at a lower level until pressure is increased via a compressor at vertical marker 550. The boost error is represented by the area between curve 504 and curve 506. In the example of FIG. 5, the reduced boost does not cause wavering combustion phase as shown in FIG. 4 because injection of the higher and lower reactivity fuels is adjusted. The combustion phase stabilizes shortly after the torque request stabilizes at 502. Thus, before the torque request transition at 502, the combustion phasing is at a first timing, and combustion phasing settles to a second timing related to fuel injection amount, fuel timing, and fuel mixture properties (e.g., reactivity of the mixed fuel composition formed by injecting a fuel with a higher reactivity and a fuel with a lower reactivity) after torque request 502 but well before vertical marker 550 where the desired and actual boost levels are substantially equal. Further, the combustion phasing has fewer tendencies to waver before reaching a steady state combustion phasing at the steady state engine operating conditions after the engine torque transition.

The amount of the compensated higher reactivity fuel 508 injected to the engine increases in response to the increase in engine torque 502 and/or desired boost at 504. The amount of the higher reactivity compensated fuel 508 is increased by more than the amount of the higher reactivity uncompensated fuel 510. The amount of the lower reactivity compensated fuel injected to the engine 522 decreases less as compared to the amount of the lower reactivity uncompensated fuel injected to the engine 520 in response to the decrease in engine torque 502 and/or desired boost 504. The injection timing of the higher reactivity compensated fuel 512 is more advanced than the timing of the higher reactivity uncompensated fuel 514 in response to the change in the engine torque at 502 and/or desired boost 504. The injection timing of the lower reactivity fuel remains constant because the fuel is injected via a port injector.

Thus, with compensating for a difference between the desired and actual boost during increasing boost, combustion phasing may be controlled so as to reduce the possibility of degraded engine emissions. Further, engine torque may have fewer tendencies to vary following a transition where actual engine boost lags desired engine boost.

Figure 6:
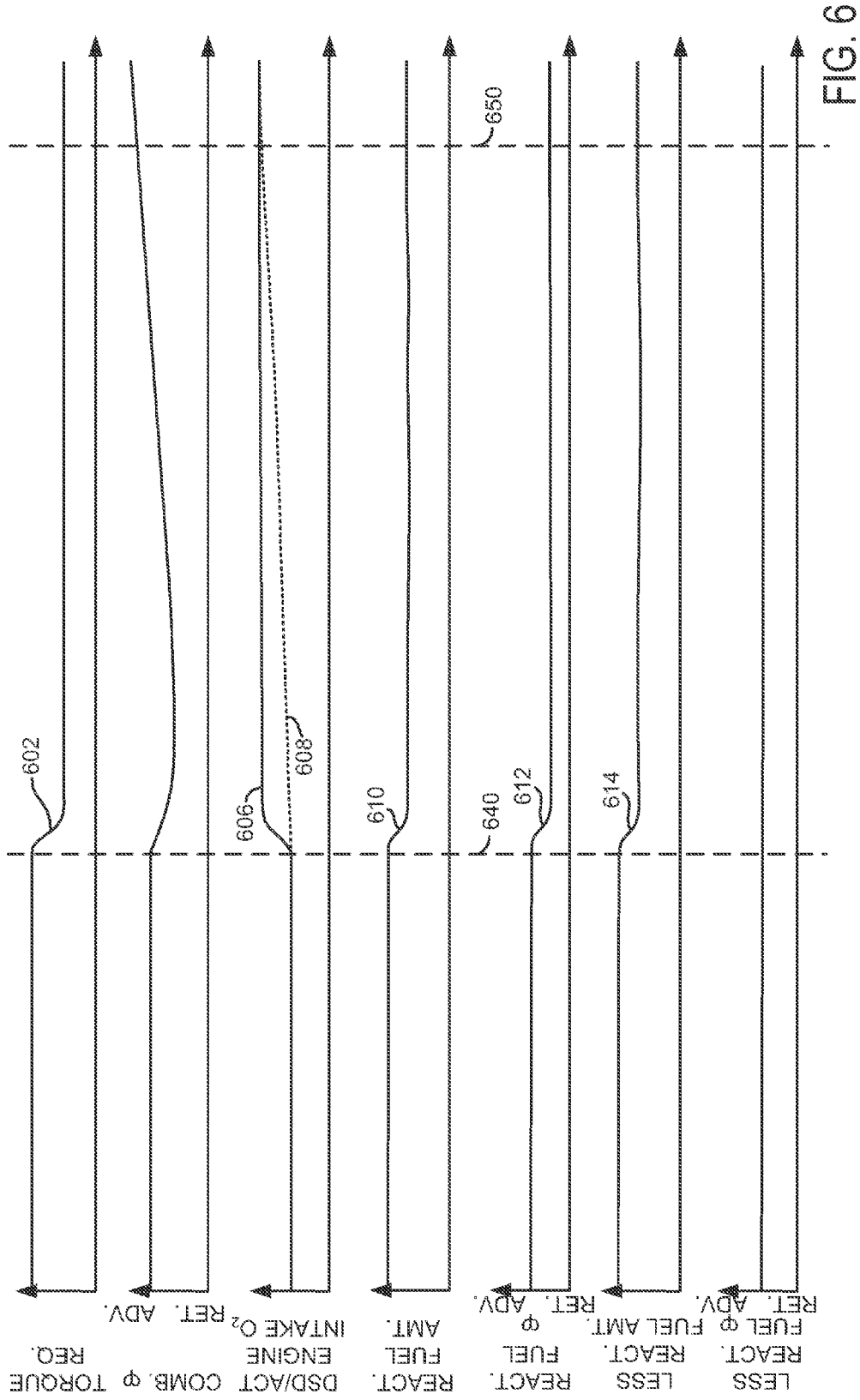

Referring now to FIG. 6, signals of interest during an uncompensated change in torque and engine intake oxygen concentration are shown. In the example of FIG. 6, there is a decrease in engine torque requested. Vertical marker 640 represents the onset of a change in engine operating conditions. Vertical marker 650 represents an end of the change in engine operating conditions. In the example of FIG. 6, the desired and actual engine intake oxygen concentration are substantially equal before vertical marker 640 and after vertical marker 650.

At 602, the engine torque request is changed from a higher level to a lower level. The desired engine intake oxygen concentration also increases as shown at 606. However, the actual engine intake oxygen concentration 608 continues at a lower level until oxygen is added the intake manifold via the engine air intake at vertical marker 650. The reduced oxygen concentration causes the combustion phase to initially retard after the change in torque request. The combustion phase eventually stabilizes at a more advanced timing after vertical marker 650. Thus, before the torque request transition at 602, the combustion phasing is at a first timing, and combustion phasing settles to a second timing related to fuel injection amount, fuel timing, and fuel mixture properties (e.g., reactivity of the mixed fuel composition formed by injecting a fuel with a higher reactivity and a fuel with a lower reactivity) after vertical marker 650.

The amount of the higher reactivity fuel injected to the engine 610 decreases in response to the decrease in engine torque at 602. Similarly, the amount of the lower reactivity fuel injected to the engine 614 decreases in response to the decrease in engine torque 602. Further, the injection timing of the higher reactivity fuel 612 is retarded in response to the change in the engine torque at 602. The injection timing of the lower reactivity fuel remains constant because the fuel is injected via a port injector.

Thus, without compensating for a difference between the desired and actual engine intake oxygen concentration, combustion phasing can shift so as to increase the possibility of degraded engine emissions. Further, engine torque can follow combustion phasing and may follow a less desirable trajectory so that the engine operator may be disturbed.

Figure 7:
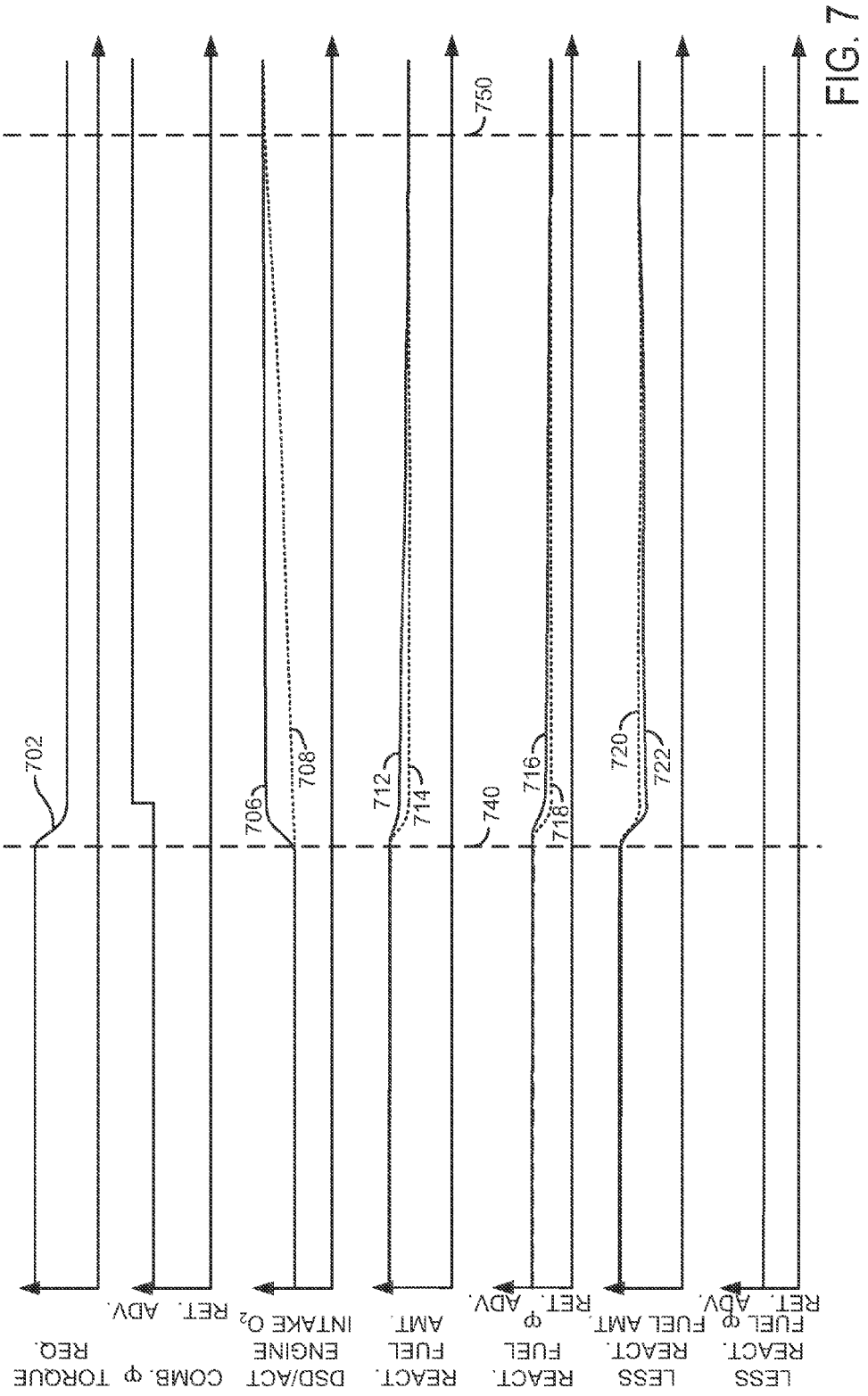

Referring now to FIG. 7, signals of interest during a compensated change in torque and EGR are shown. In the example of FIG. 7, there is a decrease in engine torque requested. Vertical marker 740 represents the onset of a change in engine operating conditions. Vertical marker 750 represents an end of the change in engine operating conditions. In the example of FIG. 7, the desired and actual engine intake oxygen concentration are substantially equal before vertical marker 740 and after vertical marker 750.

At 702, the engine torque request is changed from a higher level to a lower level. The desired engine intake oxygen concentration increases as shown at 706 because less EGR is requested at the present engine operating conditions. However, the actual engine intake oxygen concentration 708 continues at a lower level until engine intake oxygen concentration is increased via the engine air intake upstream of the throttle as is shown at vertical marker 750. In other examples, the desired engine intake oxygen concentration level may increase in response the decreasing torque request. Thus, FIG. 7 is provided for illustration purposes and is not intended to limit the methods and system disclosed herein. In the example of FIG. 7, the lower engine intake oxygen concentration does not cause wavering combustion phase as shown in FIG. 6 because injection of the higher and lower reactivity fuels is adjusted. The combustion phase stabilizes shortly after the torque request stabilizes at 702. Thus, before the torque request transition at 702, the combustion phasing is at a first timing, and combustion phasing transitions to a second timing related to fuel injection amount, fuel timing, and fuel mixture properties (e.g., reactivity of the mixed fuel composition formed by injecting a fuel with a higher reactivity and a fuel with a lower reactivity) after torque request 702 but well before vertical marker 750 where the desired and actual engine intake oxygen concentration levels are substantially equal. Further, the combustion phasing has fewer tendencies to waver before reaching a steady state combustion phasing at the steady state engine operating conditions after the engine torque transition.

The amount of the higher reactivity compensated fuel injected to the engine 712 decreases in response to the decrease in engine torque 702 and/or increased desired engine intake oxygen concentration at 706. The amount of the higher reactivity compensated fuel 712 is decreased by less than the amount of the higher reactivity uncompensated fuel 714. The amount of lower reactivity compensated fuel injected to the engine 722 decreases more as compared to the amount of lower reactivity uncompensated fuel injected to the engine 720 in response to the decrease in engine torque 702 and/or increased desired engine intake oxygen concentration. The injection timing of the higher reactivity compensated fuel 716 is more retarded than the timing of the higher reactivity uncompensated fuel 718 in response to the change in the engine torque at 702 and/or increased desired engine intake oxygen concentration 706. The injection timing of the lower reactivity fuel remains constant because the fuel is injected via a port injector.

Thus, with compensating for a difference between the desired and actual engine intake oxygen concentration, combustion phasing may be controlled so as to reduce the possibility of degraded engine emissions. Further, engine torque may have fewer tendencies to vary following a transition where engine intake oxygen concentration lags desired engine intake oxygen concentration.

Figure 8:
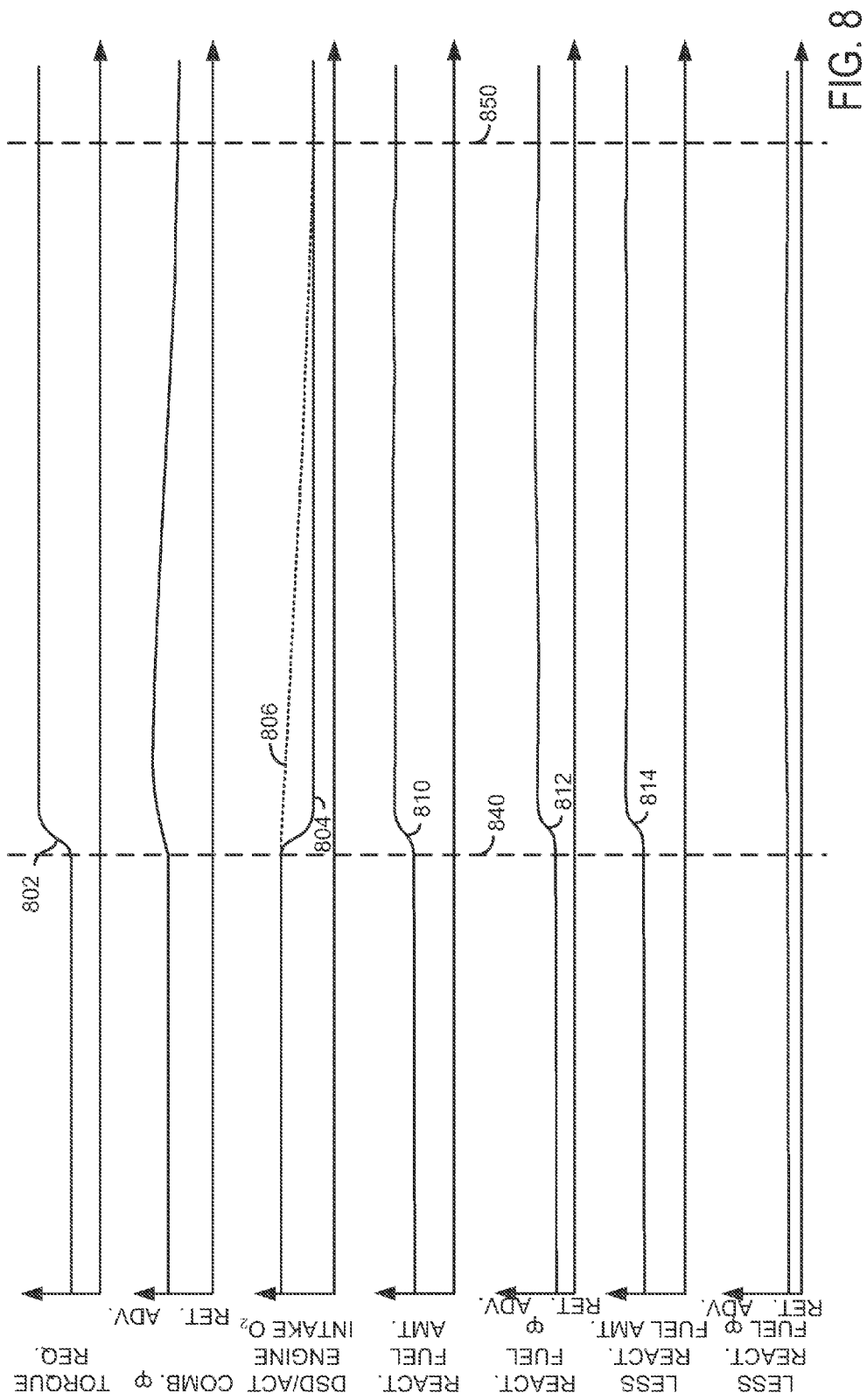

Referring now to FIG. 8, signals of interest during an uncompensated change in torque and engine intake oxygen concentration are shown. In the example of FIG. 8, there is a increase in engine torque requested. Vertical marker 840 represents the onset of a change in engine operating conditions. Vertical marker 850 represents an end of the change in engine operating conditions. In the example of FIG. 8, the desired and actual engine intake oxygen concentration are substantially equal before vertical marker 840 and after vertical marker 850.

At 802, the engine torque request is changed from a lower level to a higher level. The desired engine oxygen concentration decreases as shown at 804. However, the actual engine oxygen concentration 806 continues at a higher level until oxygen is evacuated via engine cylinders pumping at vertical marker 850. The reduced engine intake oxygen concentration causes the combustion phase to initially advance after the change in torque request. The combustion phase eventually stabilizes at a more retarded timing after vertical marker 850. Thus, before the torque request transition at 802, the combustion phasing is at a first timing, and combustion phasing settles to a second timing related to fuel injection amount, fuel timing, and fuel mixture properties (e.g., reactivity of the mixed fuel composition formed by injecting a fuel with a higher reactivity and a fuel with a lower reactivity) after vertical marker 850.

The amount of the higher reactivity fuel injected to the engine 810 increases in response to the increase in engine torque at 802. Similarly, the amount of the lower reactivity fuel injected to the engine 814 increases in response to the increase in engine torque 802. Further, the injection timing of the higher reactivity fuel 812 is advanced in response to the change in the engine torque at 802. The injection timing of the lower reactivity fuel remains constant because the fuel is injected via a port injector.

Thus, without compensating for a difference between the desired and actual engine intake oxygen concentration during decreasing engine intake oxygen concentration, combustion phasing can shift so as to increase the possibility of degraded engine emissions. Further, engine torque can follow combustion phasing and may follow a less desirable trajectory so that the engine operator may be disturbed.

Figure 9:
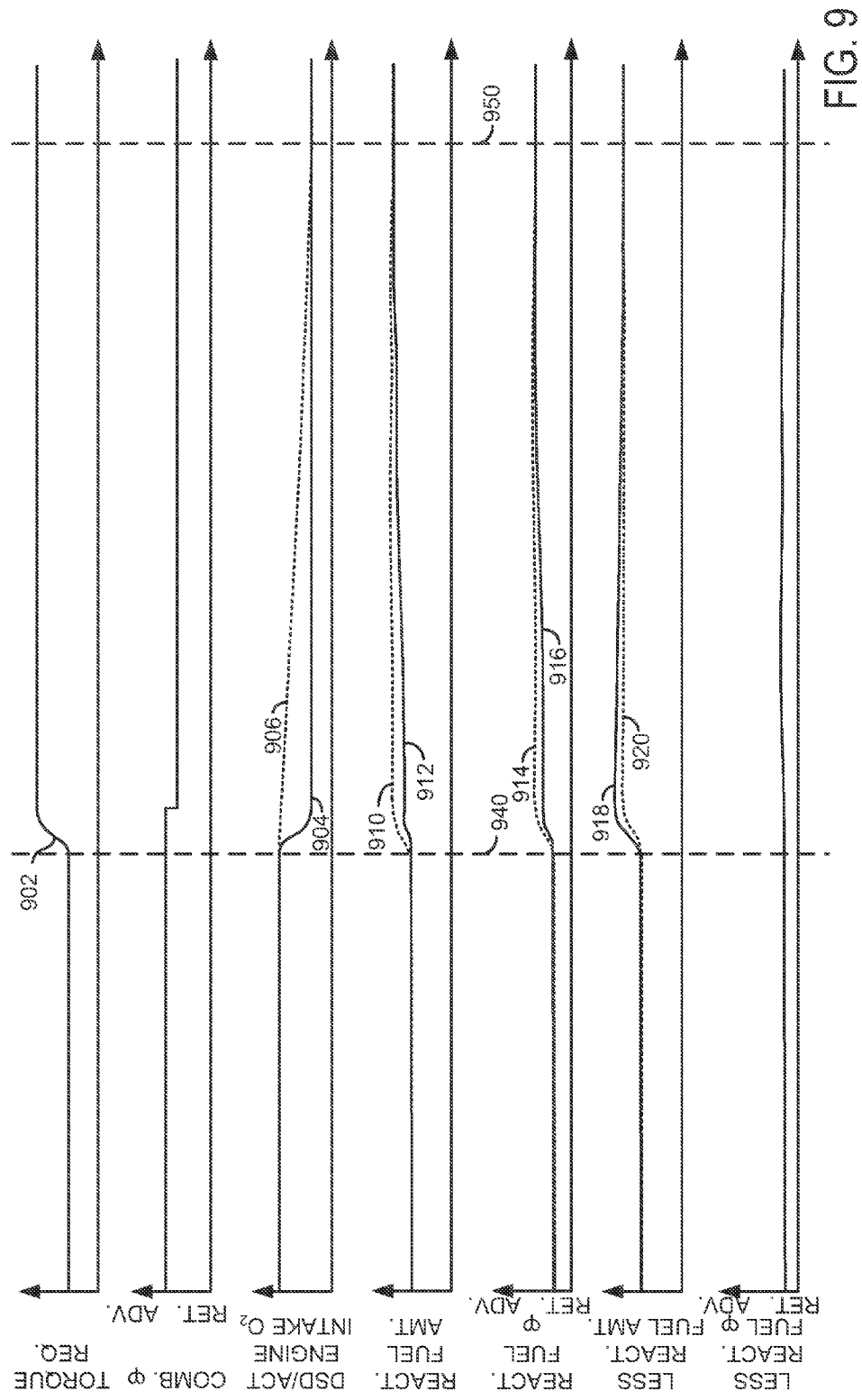

Referring now to FIG. 9, signals of interest during a compensated change in torque and engine intake oxygen concentration are shown. In the example of FIG. 9, there is a increase in engine torque requested. Vertical marker 940 represents the onset of a change in engine operating conditions. Vertical marker 950 represents an end of the change in engine operating conditions. In the example of FIG. 9, the desired and actual engine intake oxygen concentration are substantially equal before vertical marker 940 and after vertical marker 950.

At 902, the engine torque request is changed from a lower level to a higher level. The desired engine intake oxygen concentration decreases as shown at 904 because the engine may be operated with additional EGR. However, the actual engine intake oxygen concentration 906 continues at a higher level until oxygen is reduced via pumping by engine cylinders at vertical marker 950. In other examples, the desired engine oxygen concentration level may increase in response the increasing torque request. Thus, FIG. 9 is provided for illustration purposes and is not intended to limit the methods and system disclosed herein. In the example of FIG. 9, the increased engine intake oxygen concentration does not cause wavering combustion phase as shown in FIG. 8 because injection of the higher and lower reactivity fuels is adjusted. The combustion phase stabilizes shortly after the torque request stabilizes at 902. Thus, before the torque request transition at 902, the combustion phasing is at a first timing, and combustion phasing settles to a second timing related to fuel injection amount, fuel timing, and fuel mixture properties (e.g., reactivity of the mixed fuel composition formed by injecting a fuel with a higher reactivity and a fuel with a lower reactivity) after torque request 902 but well before vertical marker 950 where the desired and actual engine intake oxygen concentration levels are substantially equal. Further, the combustion phasing has fewer tendencies to waver before reaching a steady state combustion phasing at the steady state engine operating conditions after the engine torque transition.

The amount of compensated higher reactivity fuel injected to the engine 912 increases in response to the increase in engine torque 902 and/or decreased desired engine intake oxygen concentration at 904. The amount of higher reactivity compensated fuel 912 is increased by less than the amount of the higher reactivity uncompensated fuel 910. The amount of lower reactivity compensated fuel injected to the engine 918 increases more as compared to the amount of lower reactivity uncompensated fuel injected to the engine 920 in response to the increase in engine torque 902 and/or decreased desired engine intake oxygen concentration 904. The injection timing of the higher reactivity compensated fuel 916 is less advanced than the timing of the higher reactivity uncompensated fuel 914 in response to the change in the engine torque at 902 and/or decreased desired engine oxygen concentration 904. The injection timing of the lower reactivity fuel remains constant because the fuel is injected via a port injector.

Thus, with compensating for a difference between the desired and actual engine intake oxygen concentration during decreasing engine intake oxygen concentration, combustion phasing may be controlled so as to reduce the possibility of degraded engine emissions. Further, engine torque may have fewer tendencies to vary following a transition where engine intake oxygen concentration lags desired engine intake oxygen concentration.

Figure 10:
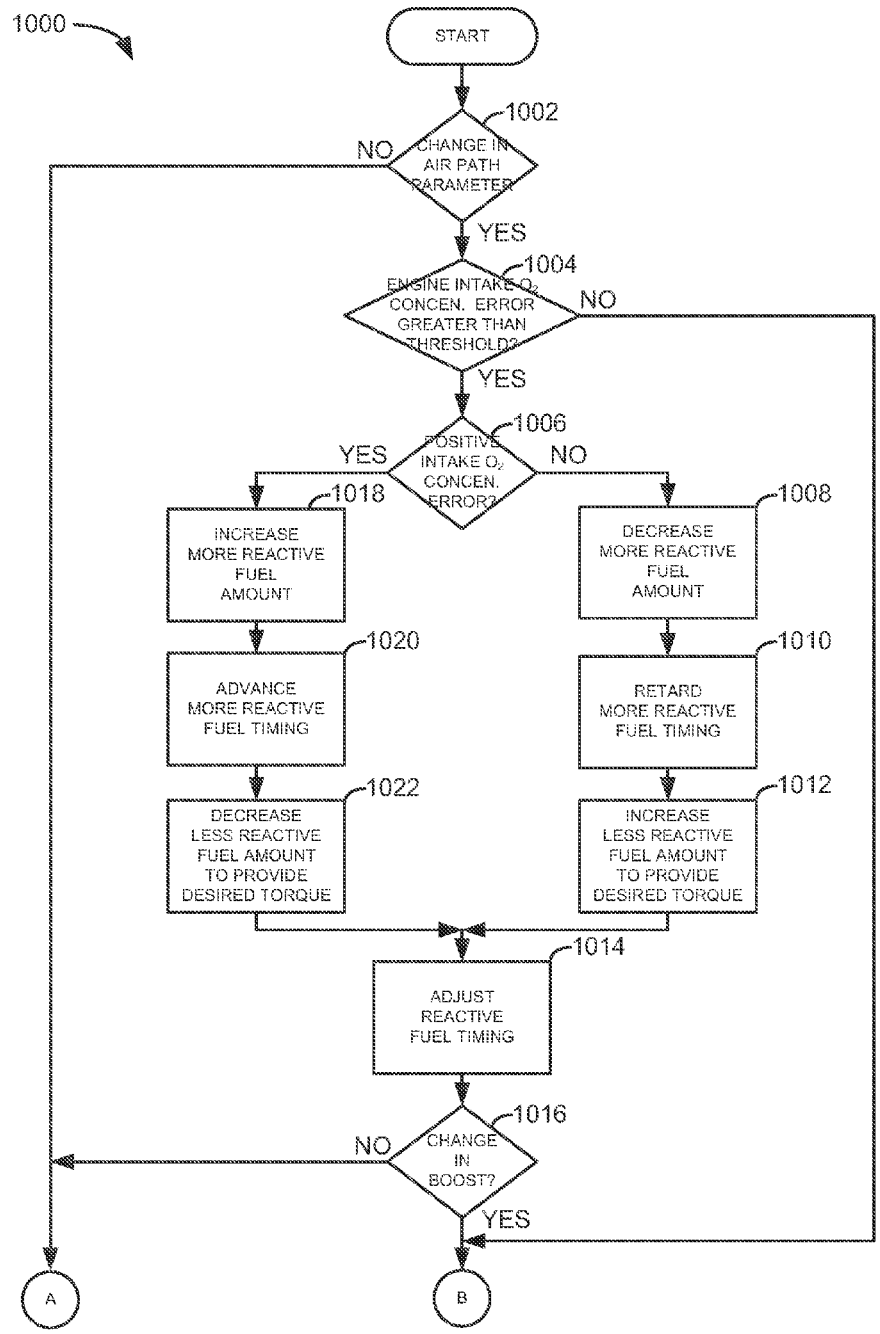
FIGS. 10-11 show a flowchart of an example method for adjusting injection of two fuels with two different reactivity rates.
Figure 11:
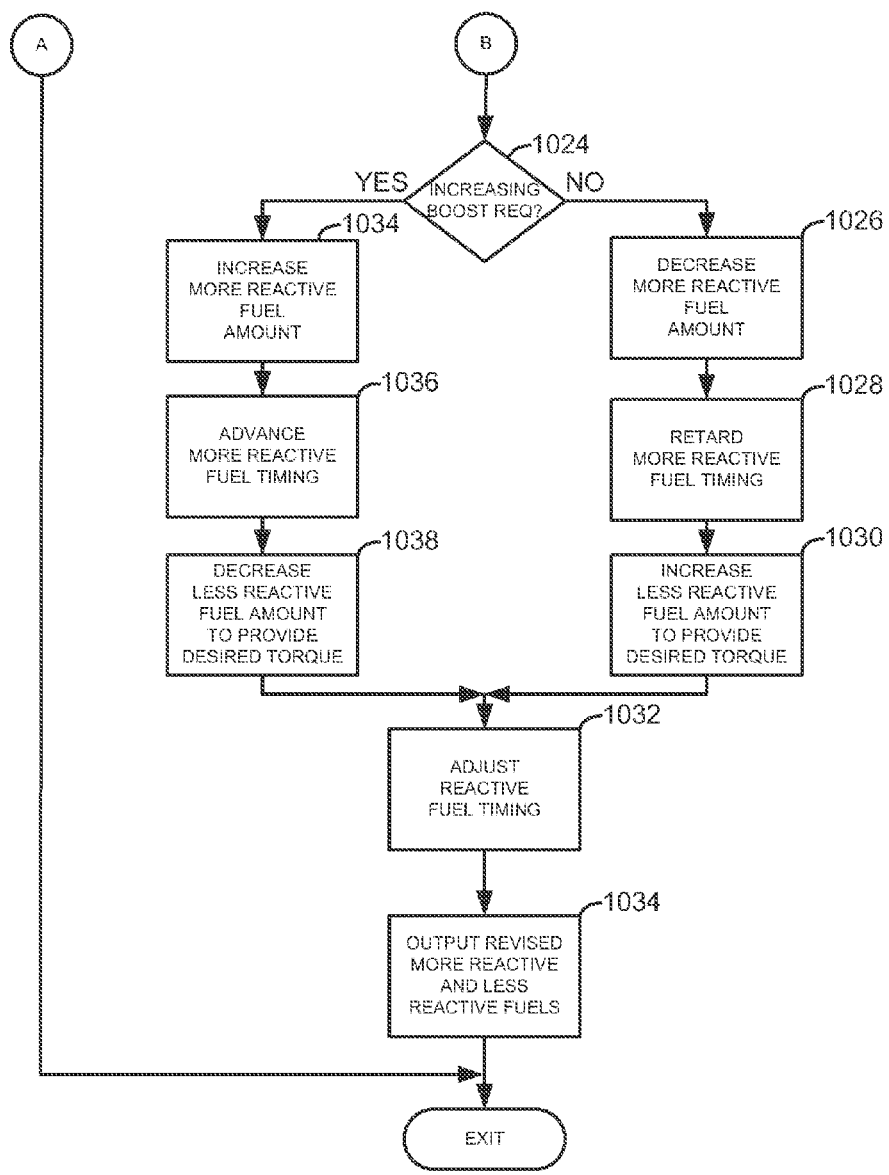

Referring now to FIGS. 10 and 11, a flowchart of an example method for adjusting injection of two fuels with two different reactivity rates is shown. The method of FIGS. 10 and 11 may be executed via instructions of controller 12 of FIG. 1. Further, the method of FIGS. 10 and 11 may provide control of engine parameters as described in FIGS. 2-9.

At 1002, method 1000 judges whether or not there is a change in one or more engine air path parameters. For example, method 1000 judges whether or not there is a change in EGR, boost, or engine air amount. In one example, the change in EGR, boost, or engine air amount is greater than a threshold change in EGR, boost, or engine air amount to qualify for a transient condition. A change in EGR amount can be determined via monitoring a position of an EGR valve or via a change in engine intake air mass and manifold pressure and temperature. A change in engine air amount may be determined from a throttle position. A change in engine intake oxygen concentration may be determined from output of an oxygen sensor. If there is a change in one or more engine air path parameters is greater than a threshold amount, method 1000 proceeds to 1004. Otherwise, method 1000 exits.

Parameters or variables of an engine air intake system may change at a rate that is lower than a rate at which fuel delivered to the engine may be changed. For example, injecting timing may be changed between engine cylinder combustion events whereas it may take several seconds for boost or EGR to fully transition from a first steady state condition to a second steady state condition. Therefore, it may be desirable to adjust fuel injection timings and amounts so as to compensate for the slower evolving engine air intake parameters or variables.

At 1004, method 1000 judges whether or not there is an engine intake oxygen concentration error. An engine intake oxygen concentration error may be determined by subtracting actual engine intake oxygen concentration from desired engine intake oxygen concentration. Desired engine intake oxygen concentration may be empirically determined during engine testing to provide a desired level of engine emissions. In one example, a table of desired engine intake oxygen concentration values is indexed via engine speed and torque amounts. The desired engine intake oxygen concentration values are based on steady state engine operating conditions (e.g., where engine operating conditions change by less than a threshold amount). If there is a change in engine intake oxygen concentration, method 1000 proceeds to 1006. Otherwise, method 1000 proceeds to 1024.

At 1006, method 1000 judges whether or not the engine intake oxygen concentration error is positive. A positive error indicates that the actual engine intake oxygen concentration is less than the desired engine intake oxygen concentration. If method 1000 judges that the engine intake oxygen concentration error is positive, method 100 proceeds to 1018. Otherwise, method 1000 proceeds to 1008.

At 1008, method 1000 decreases an amount of higher reactivity fuel injected to the engine relative to the amount of higher reactivity fuel injected to the engine at steady state operating conditions. For example, if the steady state fuel injection amount is decreasing according to changing engine speed and load, even less fuel is injected to the engine than is scheduled according to the steady state injected fuel amount. Less higher reactivity fuel may be injected to the engine via decreasing fuel pressure and/or decreasing an amount of time that an injector is open. By decreasing the amount of higher reactivity fuel injected to the engine when engine intake oxygen concentration error is negative, the increased engine intake oxygen concentration can be compensated. In one example, the amount of fuel removed to the steady state amount of higher reactivity fuel may be empirically determined and stored in a table that is indexed via engine speed and engine torque. In an alternative example, the amount of the higher reactivity fuel removed from a steady state fuel charge may be based on a difference between the desired and actual engine intake oxygen concentrations (e.g., the engine intake oxygen concentration error). The reduction amount in the steady state fuel amount of the higher reactivity fuel may be indexed via the engine intake oxygen concentration error. The steady state amount of the higher reactivity fuel is revised by subtracting the fuel reduction amount from the steady state higher reactivity fuel amount. In this way, transient engine intake oxygen concentrations may be compensated when two fuels with different reactivity are injected to an engine.

In some examples, the amount and timing of injection of the higher reactivity fuel may also be adjusted in response to engine intake air temperature. For example, if engine intake air temperature increases, the amount of the higher reactivity fuel can be reduced while the amount of the lower reactivity fuel can be increased as compared to the steady state fuel amounts of the higher and lower reactivity fuels.

At 1010, method 1000 retards fuel timing as compared to steady state operating conditions at the present engine operating conditions. Fuel timing can be retarded or advanced via adjusting timing of start of injection timing. The amount of fuel timing retard for the higher reactivity fuel may be empirically determined and stored in a table for retrieving at a later time. In one example, the fuel timing table may be indexed based on engine speed and torque. Further, in some examples the engine intake oxygen concentration error may be a basis for adjusting timing of the higher reactivity fuel. For example, a table containing amounts of fuel timing retard may be indexed via an engine intake oxygen concentration error amount, and the fuel timing amount may be retarded by the value extracted from the table.

At 1012, method 1000 increases an amount of the lower reactivity fuel injected to the engine relative to the amount of lower reactivity fuel injected to the engine at steady state operating conditions. In one example, the amount of fuel by which the lower reactivity fuel is increased may be based on the amount of fuel that the steady state amount of the higher reactivity fuel is decreased. In particular, the energy content of the fuel removed from the steady state higher reactivity fuel is determined, and the amount of the lower reactivity fuel injected is increased by an amount of fuel that has the same energy as the amount of fuel removed from the steady state higher reactivity fuel amount. In this way, the total amount of energy in the injected fuel is adjusted so as to meet the engine torque demand. Alternatively, an empirically determined amount of fuel may be determined via indexing a table or function of fuel increasing amounts and adding the amount of fuel in the table to the steady state amount of the lower reactivity fuel. Method 1000 proceeds to 1014 after the amount of the lower reactivity fuel is increased.

It should be noted that in some examples, the total amount of fuel injected to the engine is based on a desired level of engine torque. For example, it may be desirable to provide 80% of a desired amount of engine torque via a higher reactivity fuel and 20% of the desired amount of engine torque via the lower reactivity fuel. Therefore, the desired engine torque can be multiplied by 80% to determine the amount of energy to be provided via the higher reactive fuel. Accordingly, a pulse of the higher reactivity fuel can be delivered to the engine that corresponds to the amount of the higher reactivity fuel needed to provide the requested energy. The amount of lower reactivity fuel may be determined similarly.

On the other hand, if at 1006 the answer is yes, method 1000 proceeds to 1018 where method 1000 increases an amount of higher reactivity fuel injected to the engine relative to the amount of higher reactivity fuel injected to the engine at steady state operating conditions. Additional amounts of higher reactivity fuel may be injected to the engine via increasing fuel pressure and/or increasing an amount of time that an injector is open. By increasing the amount of fuel injected to the engine when engine intake oxygen concentration is positive, the engine intake oxygen concentration can be compensated by increasing the amount of the higher reactivity fuel injected to the engine. In one example, the amount of additional fuel added to the steady state amount of fuel may be empirically determined and stored in a table that is indexed via engine speed and engine torque. In an alternative example, the amount of additional fuel added to the steady state fuel amount may be based on a difference between the desired and actual engine intake oxygen concentration. The additional amount in the steady state fuel amount of the higher reactivity fuel may be indexed via the engine intake oxygen concentration error. The steady state amount of the higher reactivity fuel is revised by adding the additional fuel amount to the steady state fuel amount. In this way, transient engine intake oxygen concentration conditions may be compensated when two fuels with different reactivity are injected to an engine.

At 1020, method 1000 advances fuel timing as compared to steady state operating conditions at the present engine operating conditions. The amount of fuel timing advance for the higher reactivity fuel may be empirically determined and stored in a table for retrieving at a later time. In one example, the fuel timing table may be indexed based on engine speed and torque. Further, in some examples the engine intake oxygen concentration error may be a basis for adjusting timing of the more reactive fuel. For example, a table containing amounts of fuel timing advance may be indexed via an engine intake oxygen concentration error amount, and the fuel timing amount may be advanced by the value extracted from the table.

At 1022, method 1000 decreases an amount of the lower reactivity fuel injected to the engine. In one example, the amount of fuel by which the lower reactivity fuel is decreased may be based on the amount of fuel that the steady state amount of the higher reactivity fuel is increased. In particular, the energy content of the fuel added to the steady state more reactive fuel is determined, and the amount of the lower reactivity fuel injected is decreased by an amount of fuel that has the same energy as the amount of fuel added to the steady state more reactive fuel amount. In this way, the total amount of energy in the injected fuel is adjusted so as to meet the engine torque demand. Alternatively, an empirically determined amount of fuel may be determined via indexing a table or function of fuel decreasing amounts and subtracting the amount of fuel in the table from the steady state amount of the less reactive fuel. Method 1000 proceeds to 1014 after the amount of the lower reactivity fuel is decreased.

At 1014, the timing of the lower reactivity fuel may be adjusted. If the lower reactivity fuel is directly injected to engine cylinders, the timing of start and end of injection may be adjusted. For example, the start of injection or end of injection timing may be advanced or retarded with respect to engine crankshaft position. Method 1000 proceeds to 1016 after injection timing of the lower reactivity fuel is adjusted.

At 1016, method 1000 judges whether or not there is a change in the desired boost level. In one example, a change in boost may be determined via a change in a position f a turbocharger wastegate or vane. In some examples, a threshold change in desired boost must be exceeded before proceeding to 1024. If method 1000 judges that a change in desired boost is present, method 1000 proceeds to 1024. Otherwise, method 1000 proceeds to exit.

At 1024, method 1000 judges if the desired boost is increasing. If so, method 1000 proceeds to 1026. Otherwise method 1000 proceeds to 1034.

Method 1000 decreased the amount of the higher reactivity fuel injected at 1026, retards timing of higher reactivity fuel at 1028, and increases the amount of lower reactivity at 1030 as is described at 1008-1012. However, at 1026-1030, method 1000 makes adjustments to the higher reactivity fuel amount and timing as well as to the lower reactivity fuel amount and timing in response to the change in boost rather than the change in engine intake oxygen concentration. Thus, method 1000 provides for individual adjustments to more reactive fuel amount and timing based on change in boost. Further, method 1000 provides for individual adjustments to lower reactivity fuel amount and timing based on change in boost.

Similarly, method 1000 increases the amount of higher reactivity fuel injected at 1034, advances timing of higher reactivity fuel at 1036, and decreases the amount of lower reactivity fuel at 1038 as is described at 1018-1022. However, at 1034-1038, method 1000 makes adjustments to the higher reactivity fuel amount and timing as well as to the lower reactivity fuel amount and timing in response to the change in boost rather than the change in engine intake oxygen concentration. Thus, method 1000 provides for individual adjustments to higher reactivity fuel amount and timing based on change in boost. Further, method 1000 provides for individual adjustments to lower reactivity fuel amount and timing based on change in boost.

At 1032, the timing of the lower reactivity fuel may be adjusted. As described above with regard to 1014, if the lower reactivity fuel is directly injected to engine cylinders, the timing of start and end of injection may be adjusted. For example, the start of injection or end of injection timing may be advanced or retarded with respect to engine crankshaft position. Method 1000 proceeds to 1034 after injection timing of the lower reactivity fuel is adjusted.

At 1034, method 1000 outputs the adjustments to injection timing and fuel delivery amounts for injectors delivering higher and lower reactivity fuels. Adjustments to fuel injectors delivering higher and lower reactivity fuels are made such that both types of injectors output updated fuel amounts and timing during the same engine cycle. In this way, amounts and timings of higher and lower reactivity fuels may be adjusted to compensate for delays in the engine air intake system.

Thus, the method of FIGS. 10 and 11 provides for the sequences illustrated in FIGS. 2-9 and an engine operating method, comprising: increasing an amount of a first fuel with a first reactivity injected to a cylinder during a transition greater than a threshold in response to an engine intake oxygen concentration error; decreasing an amount of a second fuel with a second reactivity injected to the cylinder during the transition in response to the engine intake oxygen concentration error; and compression igniting the first and second fuels in the cylinder. In this way, injection of two fuels can compensate for errors in engine intake air oxygen concentration that may result from engine torque disturbances, EGR disturbances, engine mass air flow disturbances. The engine operating method further comprises advancing a fuel injection timing of the first fuel during the transition, where the amount of the first fuel is increased during cycles of the cylinder between a beginning and an end of the transition, and where the amount of the second fuel is decreased during cycles of the cylinder between the beginning and the end of the transition. The engine operating method includes where the transition is a change in engine torque, where a steady state amount and an injection timing of the first fuel are adjusted, and where the amount of the second fuel is adjusted. The engine operating method includes where the engine intake oxygen concentration error indicates oxygen in excess of a desired steady state engine intake oxygen concentration, and where the first reactivity is more reactive than the second reactivity. The engine operating method further comprises adjusting the amount of the first fuel and the second fuel in response to a boost error. The engine operating method includes where the engine intake oxygen concentration error increases in response to a position of an EGR valve. The engine operating method further comprises adjusting the amount of the first fuel in response to a difference between a desired boost amount and an actual boost amount. The engine operating method includes where the desired boost amount is a boost amount during steady state engine operating conditions, and where the engine intake oxygen amount is an engine cylinder oxygen concentration before combustion in the cylinder during a cycle of the cylinder where the amount of the first fuel is increased in response to the engine intake oxygen concentration error.

In addition, the method of FIGS. 10 and 11 provides for the sequences in FIGS. 2-9 and the engine operating method, comprises increasing a steady state amount of a first fuel scheduled for injection between a beginning and an end of a transition, the first fuel including a first reactivity; decreasing a steady state amount of a second fuel scheduled for injection between the beginning and the end of the transition, the second fuel including a second reactivity; and compression igniting the first and second fuels in an air-fuel mixture. The engine operating method further comprises advancing an injection timing of the first fuel during the transition. The engine operating method also includes where the transition is a change in engine torque, and where the steady state amount and the injection timing of the first fuel and the amount of the second fuel are further adjusted to provide a requested amount of engine torque. The engine operating method also includes where the steady state amount of the first fuel scheduled for injection between a beginning and an end of a transition, is an amount of fuel based on steady state engine speed and engine torque. The engine operating method further comprises adjusting the amount of the first fuel in response to a difference between a desired EGR amount and an actual EGR amount. The engine operating also includes where the desired EGR amount is an EGR amount during steady state engine operating conditions. The engine operating method further comprises adjusting the amount of the first fuel in response to a difference between a desired boost amount and an actual boost amount. In this way, combustion phasing may be adjusted to compensate for changes in EGR, engine air amount, and boost greater than a threshold amount. The engine operating method also includes where the desired boost amount is a boost amount during steady state engine operating conditions.

In another example, the method of FIGS. 10 and 11 includes an engine operating method, comprising: transitioning from a first engine operating state to a second engine operating state; adjusting an amount and timing of a first fuel with a first reactivity injected to a cylinder to a level more or less than scheduled for steady state operating conditions between the first and second engine operating states; and adjusting an amount of a second fuel with a second reactivity injected to the cylinder to a level more or less than scheduled for steady state operating conditions between the first and second engine operating states, a direction of the amount of the second fuel injected opposite a direction of the amount of the first fuel injected, the second reactivity less than the first reactivity. The engine operating method includes where the direction of the amount of the second fuel is decreasing and where the direction of the amount of the first fuel is increasing. The engine operating method includes where the direction of the amount of the second fuel is increasing and where the direction of the amount of the first fuel is decreasing. The engine operating method also includes where the first fuel with the first reactivity is diesel fuel, and where the second fuel with the second reactivity is gasoline or alcohol. The engine operating method also includes where an adjustment amount of the first fuel with a first reactivity is based on an EGR error. The engine operating method includes where an adjustment amount of the first fuel with a first reactivity is based on a boost error.

As will be appreciated by one of ordinary skill in the art, the method described in FIGS. 10 and 11 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
during a transition where EGR changes greater than a threshold:
increasing an amount of a first fuel with a first reactivity injected to a cylinder in response to an engine intake oxygen concentration error; and
decreasing an amount of a second fuel with a second reactivity injected to the cylinder in response to the engine intake oxygen concentration error; and
compression igniting the first and second fuels in the cylinder.

2. The engine operating method of claim 1, further comprising advancing an injection timing of the first fuel during the transition, where the amount of the first fuel is increased during cycles of the cylinder between a beginning and an end of the transition, and where the amount of the second fuel is decreased during cycles of the cylinder between the beginning and the end of the transition.

3. The engine operating method of claim 2, where a steady state amount and an injection timing of the first fuel are adjusted, and where the amount of the second fuel is adjusted.

4. The engine operating method of claim 1, where the engine intake oxygen concentration error indicates oxygen in excess of a desired steady state engine intake oxygen concentration, and where the first reactivity is more reactive than the second reactivity.

5. The engine operating method of claim 1, further comprising adjusting the amount of the first fuel and the second fuel in response to a boost error.

6. The engine operating method of claim 1, where the engine intake oxygen concentration error increases in response to a change in engine air mass flow.

7. The engine operating method of claim 1, further comprising adjusting the amount of the first fuel in response to a difference between a desired boost amount and an actual boost amount.

8. The engine operating method of claim 7, where the desired boost amount is a boost amount during steady state engine operating conditions, and where the engine intake oxygen amount is an engine cylinder oxygen concentration before combustion in the cylinder during a cycle of the cylinder where the amount of the first fuel is increased in response to the engine intake oxygen concentration error.

9. An engine operating method, comprising:
during a transition where air-charge changes greater than a threshold:
increasing an amount of a first fuel with a first reactivity injected to a cylinder in response to an engine intake oxygen concentration error; and
decreasing an amount of a second fuel with a second reactivity injected to the cylinder in response to the engine intake oxygen concentration error; and
compression igniting the first and second fuels in the cylinder.

10. The engine operating method of claim 9, further comprising advancing an injection timing of the first fuel during the transition, where the amount of the first fuel is increased during cycles of the cylinder between a beginning and an end of the transition, and where the amount of the second fuel is decreased during cycles of the cylinder between the beginning and the end of the transition.

11. The engine operating method of claim 10, where a steady state amount and an injection timing of the first fuel are adjusted, and where the amount of the second fuel is adjusted.

12. The engine operating method of claim 9, where the engine intake oxygen concentration error indicates oxygen in excess of a desired steady state engine intake oxygen concentration, and where the first reactivity is more reactive than the second reactivity.

13. The engine operating method of claim 9, further comprising adjusting the amount of the first fuel and the second fuel in response to a boost error.

14. The engine operating method of claim 9, where the engine intake oxygen concentration error increases in response to a change in engine air mass flow.

15. The engine operating method of claim 9, further comprising adjusting the amount of the first fuel in response to a difference between a desired boost amount and an actual boost amount.

16. The engine operating method of claim 15, where the desired boost amount is a boost amount during steady state engine operating conditions, and where the engine intake oxygen amount is an engine cylinder oxygen concentration before combustion in the cylinder during a cycle of the cylinder where the amount of the first fuel is increased in response to the engine intake oxygen concentration error.

17. An engine operating method, comprising:
transitioning from a first engine operating state to a second engine operating state where boost changes by more than a threshold;
adjusting an amount and timing of a first fuel with a first reactivity injected to a cylinder to a level more or less than is scheduled for steady state operating conditions between the first and second engine operating states; and
adjusting an amount of a second fuel with a second reactivity injected to the cylinder to a level more or less than is scheduled for steady state operating conditions between the first and second engine operating states, a direction of the amount of the second fuel injected opposite a direction of the amount of the first fuel injected, the second reactivity less than the first reactivity;
where an adjustment amount of the first fuel with a first reactivity is based on a boost error.

18. The engine operating method of claim 17, where the direction of the amount of the second fuel is decreasing and where the direction of the amount of the first fuel is increasing.

19. The engine operating method of claim 17, where the direction of the amount of the second fuel is increasing and where the direction of the amount of the first fuel is decreasing.

20. The engine operating method of claim 17, where the first fuel with the first reactivity is diesel fuel, and where the second fuel with the second reactivity is gasoline or alcohol.

21. The engine operating method of claim 17, where an adjustment amount of the first fuel with a first reactivity is based on an engine intake air amount error.

* * * * *